United States Patent
Liebenow

(10) Patent No.: US 6,817,289 B1
(45) Date of Patent: Nov. 16, 2004

(54) METHOD AND APPARATUS FOR MODIFYING AND CONTROLLING PRINT INFORMATION

(75) Inventor: Frank W. Liebenow, Dakota Dunes, SD (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/440,243

(22) Filed: Nov. 15, 1999

(51) Int. Cl.[7] .............................................. B41M 1/14
(52) U.S. Cl. ...................... 101/211; 101/483; 382/181; 382/162; 345/593
(58) Field of Search .................................. 101/211, 483, 101/487; 358/1.8, 1.9, 518, 537–538, 453, 296, 298, 452, 520, 1.11; 382/170, 181, 162, 164, 266, 350; 345/589, 593, 150, 604; 399/15, 28

(56) References Cited

U.S. PATENT DOCUMENTS

| | | | | |
|---|---|---|---|---|
| 5,113,356 A | * | 5/1992 | Nickell et al. ................ | 358/1.8 |
| 5,311,336 A | * | 5/1994 | Kurita et al. ................ | 358/538 |
| 5,339,392 A | * | 8/1994 | Risberg et al. ........... | 715/501.1 |
| 5,493,386 A | * | 2/1996 | Thompson ................... | 382/181 |
| 5,517,334 A | * | 5/1996 | Morag et al. ................ | 358/501 |
| 5,568,248 A | * | 10/1996 | Wagley ....................... | 399/156 |
| 5,649,024 A | * | 7/1997 | Goldsmith ................... | 382/170 |
| 5,680,636 A | * | 10/1997 | Levine et al. ................ | 715/512 |
| 5,726,781 A | * | 3/1998 | Isemura et al. ............. | 358/500 |
| 5,754,743 A | * | 5/1998 | Taraki et al. ................ | 358/501 |
| 5,805,118 A | * | 9/1998 | Mishra et al. ................ | 345/1.1 |
| 5,859,644 A | * | 1/1999 | Stokes et al. ................ | 345/431 |
| 6,067,555 A | * | 5/2000 | Hayashi ...................... | 715/528 |
| 6,094,684 A | * | 7/2000 | Pallmann .................... | 709/227 |
| 6,167,439 A | * | 12/2000 | Levine et al. ................ | 709/217 |
| 6,169,607 B1 | * | 1/2001 | Harrington .................. | 358/1.9 |
| 6,181,836 B1 | * | 1/2001 | Delean ........................ | 345/507 |
| 6,304,277 B1 | * | 10/2001 | Hoekstra et al. ............. | 345/600 |
| 6,320,592 B1 | * | 11/2001 | Evans et al. ................. | 345/600 |
| 2001/0018708 A1 | * | 8/2001 | Shisler et al. ............... | 709/220 |

* cited by examiner

*Primary Examiner*—Eugene H. Eickholt

(57) ABSTRACT

Methods and apparatuses for modifying print colors are described. A subset of printable information units, such as words, text, figures and drawings, which can be located within a document or file on a computer system, are displayed in a first color designation. This first color designation is then changed to a second color designation for printing. The printable information units are then printed.

44 Claims, 3 Drawing Sheets

US 6,817,289 B1

METHOD AND APPARATUS FOR MODIFYING AND CONTROLLING PRINT INFORMATION

FIELD OF THE INVENTION

The present invention relates generally to printing, and more specifically to the modification and control of print information of printable information units.

BACKGROUND OF THE INVENTION

With the innovation of word processing and email applications that are able to display text in a wide spectrum of colors, application users are able to demarcate or highlight specific printable information units (e.g., words, paragraphs, figures and drawings) of a particular document or message. Moreover, in some of the current applications, these printable information units default to being color for certain documents and messages. One example is for reply messages on the email application, Microsoft® Outlook, where the default color of the reply text is blue.

Additionally, color printers allow the users of these applications to not only display but also print in color. However, at times, an application user may want to print these colored fields in black and white. Under today's systems, application users are provided the option of printing in black and white those documents that are colored. However, a disadvantage of these systems are that the users are limited to either printing the entire document or message in color or in black and white. This problem leads to over usage of colored inks of colored printers for text that is not needed or required to be printed in color. Returning to the example above concerning Microsoft® Outlook where the default color for reply messages is blue, inevitably, application users who print reply messages from this application on colored printers would run dry the blue color of the colored printer more quickly and unnecessarily than the other colors of the colored printer. Accordingly, it would be desirable to improve the current system of displaying and printing of colored text in a document or message.

SUMMARY OF THE INVENTION

The above-mentioned shortcomings, disadvantages and problems are addressed by embodiments of the present invention, which will be understood by reading and studying the following specification. The invention describes methods and apparatuses for modifying and controlling print information. In one embodiment, a color designation for a subset of printable information units is overridden for printing. Examples of printable information units include, but are not limited to, words, text, figures and drawings in a document and/or file on a computer system. In one implementation, the color designation is changed from non-black to black. The printable information units are then printed. In additional embodiments, the overriding of the color designation is based on user input and non-user input.

In an alternative embodiment, printable information units are displayed, wherein a subset of the printable information units are of a first color designation.

The first color designation for this subset is then changed to a second color designation for printing. The printable information units are then sent to a printer to be printed. In another embodiment, a color of a subset of a plurality of displayed text is designated for display. The color of the subset is changed for printing. The plurality of displayed text is then sent to a printer. In yet a further embodiment, a print code is attached to a subset of printable information units, such that the print code precludes the printing of the subset. The printable information units are then sent to a printer to be printed.

Still other and further aspects and embodiments of the present invention will become apparent by reference to the drawings and by reading the following detailed description.

DESCRIPTION OF EMBODIMENTS

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
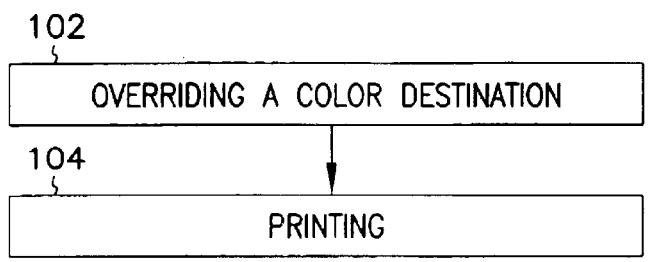
FIG. 1 is a flowchart of a method for modifying the print colors according to one embodiment of the present invention.
Figure 4:
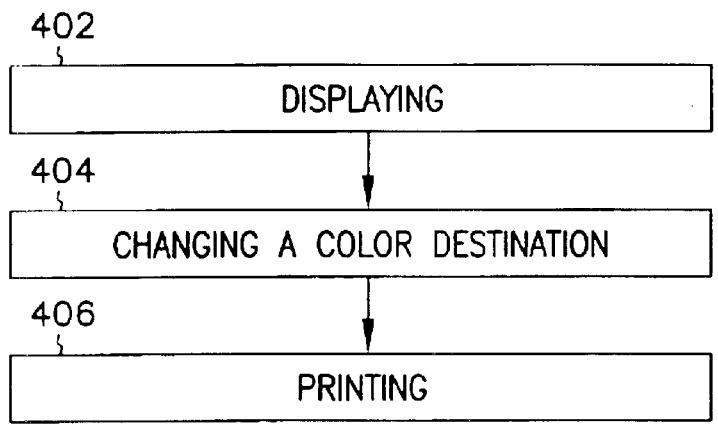
FIG. 4 is a flowchart of a method for modifying the print colors according to another embodiment of the present invention.
Figure 5:
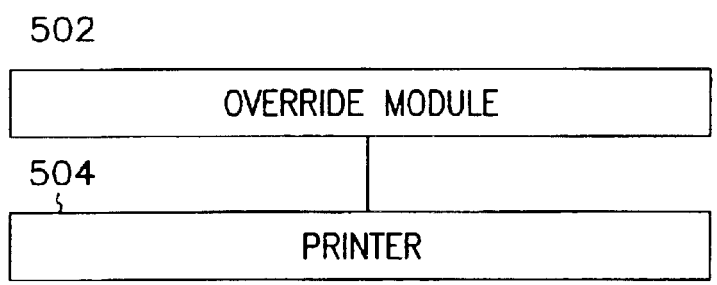
FIG. 5 is a flowchart of a method for modifying the print colors according to another embodiment of the present invention.

FIGS. 1, 4 and 5 are flowcharts of methods in accordance with embodiments of the invention. The methods are realized at least in part as one or more programs running on a computer—that is, as a program executed from a computer-readable medium such as a memory by a processor of a computer. The programs are desirably storable on a computer-readable medium such as a floppy disk, a Compact Disk-Read Only Memory (CD-ROM), for distribution and installation and execution on another (suitably equipped) computer. Additionally, each of the blocks or combinations of blocks in FIGS. 1, 4 and 5 describe functionality that may be implemented in one or more software modules which can easily be written by one skilled in the art with reference to the flowcharts:

In FIG. 1, in block 102, a color designation for printing of a subset of a plurality of printable information units is overridden. In one embodiment, a subset 10 of the plurality of printable information units is defined as less than all of the printable information units. In another embodiment, a color designation is a code assigned to a printable information unit that defines its color for both display and print. In one embodiment, the plurality of printable information units are words. Additionally, the embodiments of the present invention are such that it is anticipated that the printable information units could be portions of a markup language (e.g., HTML (Hypertext Markup Language). In block 104, the plurality of printable information units are printed, including those units whose color designation has been overridden for printing.

Figure 2:
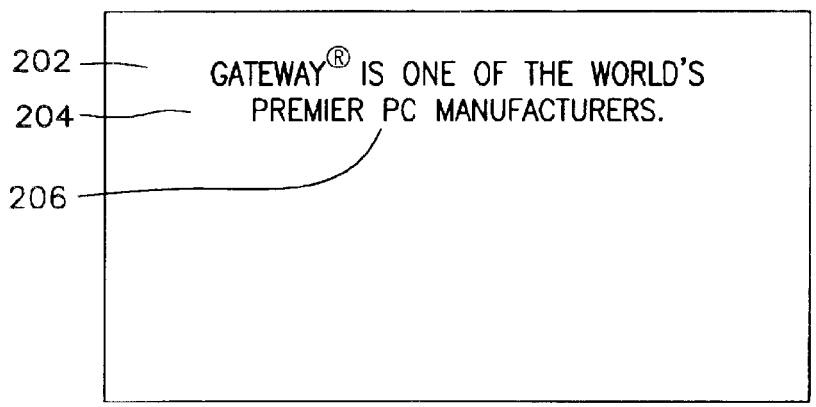
FIG. 2 illustrates one embodiment of the present invention used in conjunction with a word processing document.

For example, the printable information units could be words within a word processing document with each one having a color designation such that portions of the document are displayed in different colors. One such embodiment is illustrated in FIG. 2. In particular, FIG. 2 illustrates one embodiment wherein the printable information units are words located in a word processing document. FIG. 2 includes a number of printable information units including the word "Gateway" (i.e., blue unit 202) displaying in a blue color, "premier" (i.e., green unit 204) and "PC" (i.e., green unit 206) both displaying in a green color. In an alternative embodiment, the plurality of printable information units are groups of words, for example an entire paragraph within a document. In another embodiment, the printable information unit is a figure or drawing. However, it is important to appreciate that the plurality of printable information units is not limited to any particular type of unit.

In one embodiment, the color designation for printing of the subset of the plurality of printable information units is overridden by changing a non-black color designation to a black color designation. Advantageously, this embodiment reserves the colored inks of printers for those printable information units that the computer user desires to be printed in colored ink, while not wasting colored ink on those portions of the document that need not be printed in color. In another embodiment, the plurality of printable information units are located in a file. In an alternative embodiment, the plurality of printable information units are located in a word processing document. This functionality for overriding of a color designation is such that it anticipates being located not only in a system or computer but also in a printer server or the printer itself.

Figure 3:
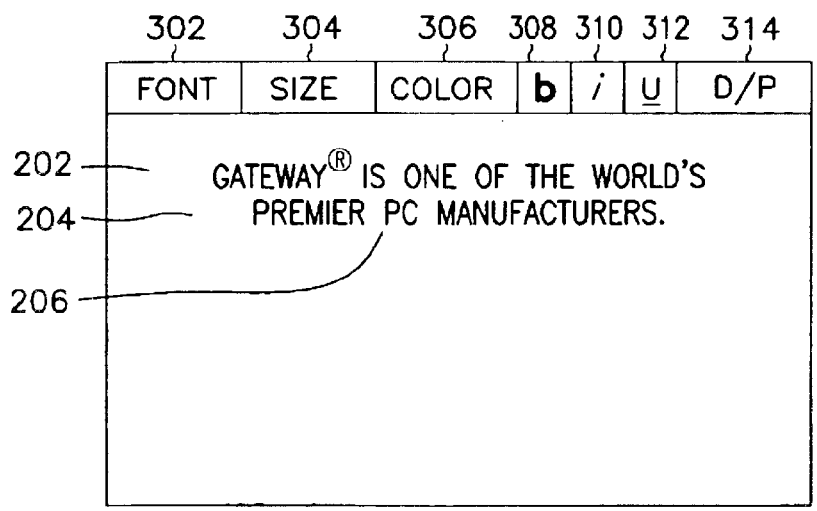
FIG. 3 illustrates another embodiment of the present invention used in conjunction with a word processing document.

FIG. 3 illustrates a further embodiment of the present invention built on the embodiment of FIG. 2. In particular, the overriding of the color designation is based on user input. In this example, assume that a computer user desires that the word "Gateway" be printed in the blue color but desires that "premier" and "PC" be printed in black (not the green color in which they are displayed) in order to preserve the colored inks of the printer. The computer user would label "premier" and "PC" as having this characteristic of displaying in one color and printing in a different color. In particular, FIG. 3 illustrates a word processing document being edited by a typical word processing application (e.g., Microsoft® Word) that incorporates one embodiment of the present invention. FIG. 3 includes the typical buttons 302–312 that allow the computer user to edit the word processing document. In particular, buttons 302–306 allow for modification of the font, size or color of the text, respectively. Moreover, buttons 308–312 allow for text to be in bold, italicized and underlined, respectively. Additionally, FIG. 3 includes button 314 which allows the computer user to specify that certain text be displayed in one color while being printed in a different color. For example, the computer user could label green fields 204–206 using button 314. Accordingly, green fields 204–206 would still be displayed in green but be printed in a different color (e.g., black), while also allowing blue field 202 to still be printed out in blue.

In one embodiment, this different print color is based on a user-defined setting. For example, button 314 could be set such that the user wants all text in the document associated with button 314 to be printed in black, even though the text still displays in a different color. In one embodiment, the identification of those printable information units that are displayed in one color but printed in a different color (e.g., those units associated with button 314) are identifiable to the user during normal text editing mode of the word processing application. In an alternative embodiment, identification of these printable information units to the user are displayed in a non-normal text mode (e.g., a print preview mode). In other words, the identification of to these units is transparent to the user during normal text editing mode.

Advantageously, this invention displays in one color and prints in a different color for a specific printable information unit, thereby preserving the colored ink resources of a colored printer for only those fields that the user desires to print in color. Accordingly, in contrast to the prior art, the computer user is not confined to the choice of printing the entire document in black and white or printing the entire document in the displayed colors. Rather, specific printable information units can be displayed in one color and printed in a different color, independent of the other print information units.

In one embodiment, overriding of a color designation for printing of a subset of the plurality of printable information units is based on non-user input. In one such embodiment, the overriding of a color designation is based on a user and/or a group identification. For example, the color designation of the footnotes within a word processing document are overridden based on the group identification of the user. In one such example, for all engineers the display color is black. However, for software engineers, the print color is blue, while for hardware engineers, the print is green.

Additionally, other embodiments of the present invention could be used in conjunction with security issues. In one embodiment, the subset of the plurality of printable information units, whose color designation is overridden for printing, are portions of a document, such that these portions allow the document to be identified as a copy. In one such embodiment, this subset, whose color designation is overridden, is the header information or company logo that is displayed in color but is defined such that it is printed in black. Advantageously, this embodiment allows for the distinguishing between an original and a printed-out version, such that the header information and/or company logo is in color for the original version but in black for the printed-out version. Such embodiment could be implemented in a system that restricts access to the modification of this subset. For example, only certain individuals would have password accessability to allow for modification of the display and print colors of the header information and/or company logo. Accordingly, this type of system would preclude unauthorized individuals from printing out a version of the document where the header information and/or company logo are in color.

Another embodiment of the present invention that can be used in conjunction with issues of security and confidentiality allows a plurality of printable information units to be displayed but only allows a portion of these units to be printed. In one such embodiment for printing a plurality of printable information units, a print code is attached to a subset of the plurality of printable information units. This print code precludes the printing out of the subset. In another such embodiment, the print color may be set to "white", thereby preserving spacing but not printing sensitive information. Either embodiment includes the sending of the plurality of printable information units to a printer. Therefore, only the plurality of printable information units are printed even though all of the units could be displayed. For example, if a computer user desires to write a document such that a portion is confidential, the computer user could identify or label the material in the document that is confidential (i.e., the subset of the printable information units), as illustrated in FIG. 3. Accordingly, this portion of the document would still be displayed but would not be printed out when the document is printed. Advantageously, this embodiment allows the computer user to incorporate confidential information into documents, while printing out only those portions of the document that are nonconfidential.

FIG. 4 is a flowchart of a method in accordance with another embodiment of the invention. In block 402, a plurality of printable information units are displayed, for example on a display device (e.g., a computer monitor) of a computer.

A subset within the plurality of printable information units is of a first color designation. In one embodiment, the plurality of printable information units are located within a file on a computer system. In an alternative embodiment, the plurality of printable information units are located within a word processing document.

In block 404, the first color designation for the subset is changed to a second color designation for printing. In one embodiment, the first color designation for the subset of the plurality of printable information units is a non-black color designation. In another embodiment, the second color designation for the subset is a black color designation. In one embodiment, the first color designation of the subset is changed to a second color designation for printing based on user input, one such example having been described above in conjunction with FIG. 3. In an alternative embodiment, the first color designation of the subset is changed to a second color designation for printing based on non-user input. In one such embodiment, the changing of the color designation is based on a user and/or a group identification. In block 406, the plurality of printable information units are sent to a printer to be printed.

FIG. 5 is a flowchart of a method in accordance with another embodiment of the invention. In block 502, a color of a subset of a plurality of displayed text for display is designated. In one embodiment, the plurality of displayed text are located within a file on a computer system. In an alternative embodiment, the plurality of displayed text are located within a word processing document.

In block 504, the color of the subset is changed for printing to allow the subset to be displayed in one color and be printed in a different color. In one embodiment, the color of the subset is changed for printing by changing the color from non-black to black. In another embodiment, the color of the subset is changed for printing based on user input, while in an alternative embodiment, this change is based on non-user input. In one embodiment where the change is based on non-user input, the change is based on a user and/or group identification for a particular user. In another embodiment where the change is based on non-user input, the change is based upon processing of a particular form of text input; for example, in Microsoft® Outlook, the text in a mail message responding to earlier mail may default to text that is displayed as blue but prints as black. In block 506, the plurality of displayed text that includes the subset, whose color was changed for printing, is sent to a printer.

Examples of the method according to FIG. 5 are described above in conjunction with FIGS. 2-3.

Figure 6:
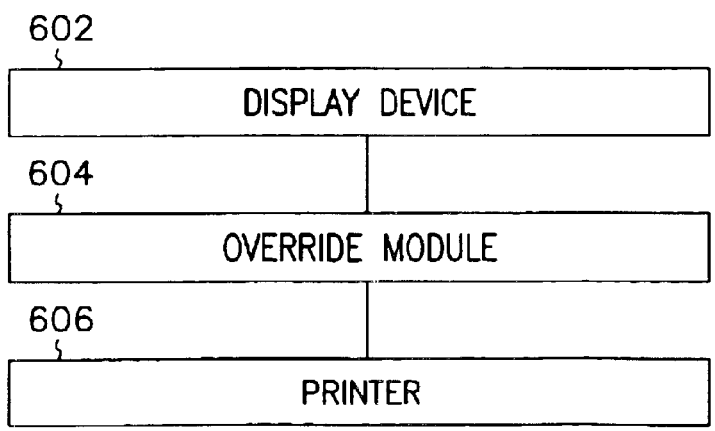
FIG. 6 is a block diagram illustrating the major components of a system embodiment of the present invention.

Referring to FIG. 6, a block diagram according to one embodiment of a system of the present invention is shown. The system of FIG. 6 includes override module 602 and printer 604. In one embodiment, override module 602 is part of a computer, although the invention is not so limited. In such an embodiment, override module 602 is a computer program (e.g., an override program) executed by a processor of the computer from a computer-readable medium such as a memory thereof. Additionally, in other embodiments, override module 602 is anticipated being located not only in a system or computer but also in a printer server or the printer itself (e.g., printer 604).

Override module 602 receives a plurality of printable information units with each one of the units having a color designation. Override module 602 overrides the color designation for printing of a subset of the plurality of printable information units. In one embodiment, a subset of the plurality of printable information units is defined as less than all of the printable information units. In another embodiment, a color designation is a code assigned to a printable information unit that defines its color for both display and print. In one embodiment, the plurality of printable information units are words. For example, the printable information units could be words within a word processing document with each one having a color designation such that portions of the document are in different colors, as illustrated and described above in conjunction with FIG. 2. Moreover, the embodiments of the present invention are such that it is anticipated that the printable information units could be portions of a markup language (e.g., HTML (Hypertext Markup Language).

In one embodiment, override module 602 overrides the color designation for printing of a subset of the plurality of printable information units based on user input, as illustrated and described above in conjunction with FIG. 3. In one embodiment, this different print color is based on a user-defined setting. In another embodiment, identification of those printable information units that are displayed in one color but printed in a different color is displayed in the normal text editing mode of the word processing application. In an alternative embodiment, identification of these printable information units to the computer user are displayed in a non-normal text mode (e.g., a print preview mode).

In one embodiment, override module 602 overrides a color designation for printing of a subset of the plurality of printable information units based on non-user input. In one such embodiment, the overriding of a color designation is based on a user and/or a group identification. For example, the color designation of the footnotes within a word processing document are overridden based on the group identification of the user.

The system of FIG. 6 also includes printer 604 that is operatively coupled to override module 602. Printer 604 receives and prints the plurality of printable information units. Other embodiments of the system of FIG. 6 could be used with issues of security and confidentiality, as previously described above in conjunction with method embodiments of the present invention.

Additionally, in one embodiment, override module 602 overrides the color designation for printing of the subset of the plurality of printable information units by changing a non-black color designation to a black color designation. Advantageously, this embodiment reserves the colored inks of printers for those printable information units that the computer user desires to be printed in colored ink, while not wasting colored ink on those portions of the document that need not be printed in color. In another embodiment, the plurality of printable information units are located in a file. In an alternative embodiment, the plurality of printable information units are located in a word processing document.

Figure 7:
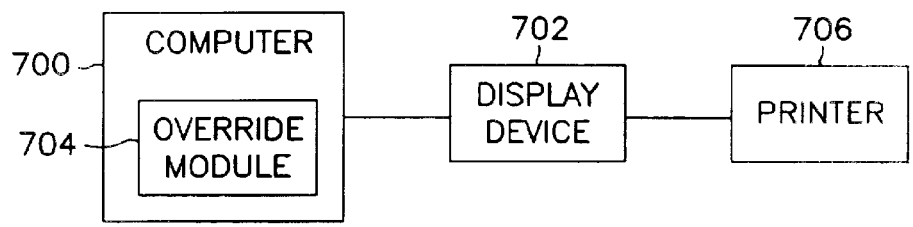
FIG. 7 is a block diagram illustrating the major components of another system embodiment of the present invention.

Referring next to FIG. 7, a block diagram according to another embodiment of a system of the present invention is shown. The system of FIG. 7 includes computer 700, display device 702, override module 704 and printer 706. In one embodiment, override module 704 is part of computer 700, although the invention is not so limited. In such an embodiment, override module 704 is a computer program (e.g., an override program) executed by a processor of computer 700 from a computer-readable medium such as a memory thereof.

Display device 702 receives and displays a plurality of printable information units. An embodiment of display device 702 includes a computer monitor. A subset in the plurality of printable information units is a first color designation. The system of FIG. 7 also includes override module 704 that is operatively coupled to display device 702. Override module 704 receives the plurality of printable information units and changes the first color designation of the subset to a second color designation for printing, as previously described in conjunction with override module 602 of FIG. 6.

Additionally, the system of FIG. 7 includes printer 706 that is operatively coupled to override module 704. Printer 706 receives and prints the plurality of printable information units, as previously described in conjunction with printer 604 of FIG. 6.

Figure 8:
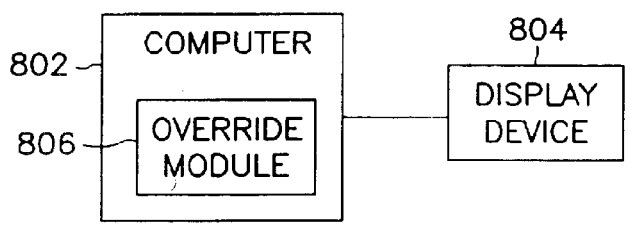
FIG. 8 is a block diagram illustrating the major components of another system embodiment of the present invention.

Referring next to FIG. 8, a block diagram according to an embodiment of a computer system of the present invention is shown. The system of FIG. 8 includes computer 802, display device 804 and override module 806. In one embodiment, override module 806 is part of computer 802, although the invention is not so limited. In such an embodiment, override module 806 is a computer program (e.g., a override program) executed by a processor of computer 802 from a computer-readable medium such as a memory thereof.

Computer 802 has a plurality of printable information units. These plurality of printable information units include a subset that have a first color designation. In one embodiment, the plurality of printable information units are included in a file or word processing document, as described above. The system of FIG. 8 also includes display device 804 that is operatively coupled to computer 802. Display device 804 is capable of displaying the printable information units.

Additionally, the system of FIG. 8 includes override module 806 located in computer 802. Override module 806 includes machine readable instruction that cause computer 802 to change the first color designation of the subset of the plurality of printable information units to a different color designation for printing, as previously described in conjunction with override module 602 of FIG. 6. In one embodiment, the system of FIG. 8 also includes a printer that is operatively coupled to computer 802 and display device 804. This printer is capable of printing the plurality of printable information units, as previously described in conjunction with printer 604 of FIG. 6.

Figure 9:
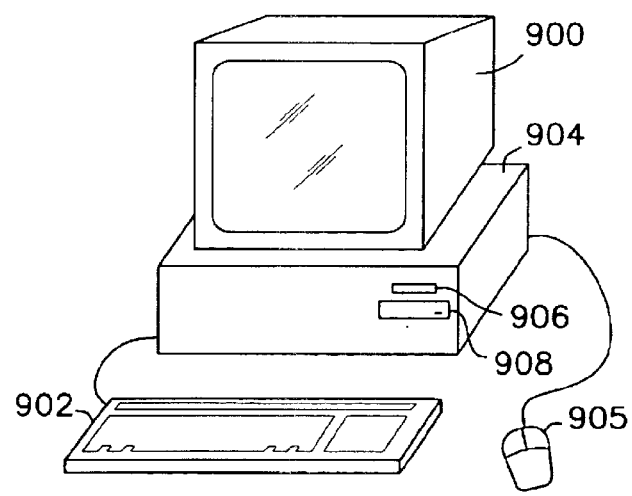
FIG. 9 is a block perspective diagram of a computer system embodiment of the present invention.

Personal computers, as shown in FIG. 9, typically include a monitor 900, keyboard input 902, central processing unit 904, and a pointing or selection device such as mouse 905. Further components of a typical computer system may include a machine readable storage media such as disk drive 906, hard disk, CD-ROM 908, DVD, modem, and the like. The processor unit of such a computer typically includes a microprocessor, memory (RAM and ROM), and other peripheral circuitry, not shown.

Method and apparatus embodiments of the present invention comprise computer programs written for the modification of print information of printable information units as shown in FIG. 9. The computer programs run on the central processing unit 904 out of main memory, and may be transferred to main memory from permanent storage via disk drive 906 when stored on removable media or via a network connection or modem connection when Stored outside of the personal computer, or via other types of computer or machine readable medium from which it can be read and utilized. The computer programs comprise multiple modules or objects to perform the method embodiments of the present invention, or the functions of the modules in the apparatus embodiments of the present invention. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

I claim:

1. A method of printing, comprising:
   overriding a color designation for printing of a subset of a plurality of printable information unit;
   changing the color designation to a printing color designation wherein the color designation remains unchanged for display; and
   printing the plurality of printable information units such that the subset is printed in accordance with the printing color designation.

2. The method of claim 1, wherein overriding by changing the color designation for printing of the subset of the plurality of printable information units includes changing for printing a non-black color designation of the subset to a black color designation.

3. The method of claim 1, wherein overriding by changing the color designation for printing of the subset of the plurality of printable information units is independent of a user input.

4. The method of claim 1, wherein changing the color of the subset for printing is based on a group identification.

5. The method of claim 1, wherein the subset of the plurality of printable information units comprises footnote text.

6. The method of claim 1, wherein the subset of the plurality of printable information units comprises text selected by a user, said text included in the subset without regard to text characteristics.

7. A method of printing, comprising:
   displaying a plurality of printable information units of a text processing document, wherein a subset in the plurality of printable information units has a first color designation;
   changing the first color designation for the subset to a second color designation for printing; and
   sending the plurality of printable information units to a printer for printing in accordance with the second color designation.

8. The method of claim 7, further comprising printing the plurality of printable information units.

9. The method of claim 7, wherein changing the first color designation for the subset to the second color designation includes changing from a non-black color designation for the subset to a black color designation.

10. The method of claim 7, wherein changing the first color designation for the subset to the second color designation is based on a user input.

11. The method of claim 7, wherein the text processing document comprising an HTML (Hyper Text Markup Language) file.

12. The method of claim 7, wherein the text processing document comprises an electronic mail message.

13. A method of printing, comprising:
   designating a color of a subset of a plurality of displayed text for display;
   overriding the color by changing the color of the subset for printing; and
   sending the plurality of displayed text to a printer after said overriding;
   wherein changing the color of the subset for printing is based on a user identification.

14. The method of claim 13, wherein changing the color of the subset for printing includes changing from a non-black color designation of the subset to a black color designation.

15. A computer readable medium having instructions stored thereon for causing a computer to perform a method comprising:
   overriding a color designation for printing of a subset of a plurality of printable information units;
   changing the color designation to a printing color designation wherein the color designation remains unchanged for display; and
   printing the plurality of printable information units such that the subset is printed in accordance with the printing color designation.

16. The computer readable medium of claim 15, wherein overriding by changing the color designation for printing of the subset of the plurality of printable information units includes changing for printing a non-black color designation of the subset to a black color designation.

17. The computer readable medium of claim 15, wherein overriding by changing the color designation for printing of the subset of the plurality of printable information units is independent of a user input.

18. The computer readable medium of claim 15, wherein changing the color of the subset for printing is based on a group identification.

19. The computer readable medium of claim 15, wherein the subset of the plurality of printable information units comprises footnote text.

20. The computer readable medium of claim 15, wherein the subset of the plurality of printable information units comprises text selected by a user, said text included in the subset without regard to text characteristics.

21. A computer readable medium having instructions stored thereon for causing a computer to perform a method comprising:
   displaying a plurality of printable information units of a text processing document, wherein a subset in the plurality of printable information units has a first color designation;
   overriding by changing the first color designation for the subset to a second color designation for printing; and
   sending the plurality of printable information units to a printer in accordance with the second color designation.

22. The computer readable medium of claim 21 wherein changing the first color designation for the subset to the second color designation includes changing from a non-black color designation for the subset to a black color designation.

23. The computer readable medium of claim 21, wherein the text processing document comprises an HTML (Hyper Text Markup Language) file.

24. The computer readable medium of claim 21, wherein the text processing document comprises an electronic mail message.

25. A computer readable medium having instructions stored thereon for causing a computer to perform a method comprising:
   designating a color for display of a subset of a plurality of displayed text of a text processing document:
   overriding by changing the color for printing of the subset; and
   sending the plurality of displayed text to a printer after said overriding.

26. The computer readable medium of claim 25, wherein changing the color for printing of the subset includes changing from a non-black color designation of the subset to a black color designation.

27. The computer readable medium of claim 25, wherein the text processing document comprises an HTML (Hyper Text Markup Language) file.

28. The computer readable medium of claim 25, wherein the text processing document comprises an electronic mail message.

29. A system, comprising:
   an override module that receives a plurality of printable information units, each one of the plurality of printable information units having a display color designation, and override the display color designation to a printing color designation for printing of a subset of the plurality of printable information units; and
   a printer, operatively coupled to the override module, that receives the plurality of printable information units and prints the plurality of printable information units in accordance with the printing color designation;
   wherein the override module overrides the display color designation based on a user identification.

30. The system of claim 29, wherein the display color designation is overridden from a non-black display color designation to a black printing color designation.

31. The system of claim 29, wherein the plurality of printable information units include a plurality of words.

32. The system of claim 29, wherein the override module overrides the display color designation independent of a user input.

33. A system comprising:
   a display device that receives a plurality of printable information units of a text processing document and displays the plurality of printable information units, wherein a subset in the plurality of the printable information units has a first color designation;
   an override module, operatively coupled to the display device, that receives the plurality of printable information units and changes the first color designation of the subset to a second color designation for printing; and
   a printer, operatively coupled to the modification module, that receives the plurality of printable information units and prints the plurality of printable information units.

34. The system of claim 33, wherein the first color designation includes a non-black color and the second color designation includes a black color.

35. The system of claim 33, wherein the override module identifies the subset based on a user input.

36. The system of claim 33, wherein the override module changes the first color of the subset based on a group identification.

37. The system of claim 33, wherein the subset comprises footnote text.

38. The system of claim 33, wherein the subset comprises text selected by a user, said text included in the subset without regard to text characteristics.

39. The system of claim 33, wherein the text processing document comprises an HTML (Hyper Text Markup Language) document.

40. The system of claim 33, wherein the text processing document comprises an electronic mail message.

41. A computer system comprising:
   a computer having a plurality of printable information units, wherein a subset in the plurality of printable information units has a first color designation;
   a display device operatively coupled to the computer and capable of displaying the printable information units; and
   an override module located in the computer, comprising machine readable instruction for causing the computer to perform a method including changing the first color designation for printing of the subset to a second color designation;
   wherein the override module changes the first color designation for printing of the subset to the second color designation based on a user identification.

42. The computer system of claim 41, wherein he override module further comprises machine readable instruction for causing the computer to include sending the plurality of displayed text to a printer.

43. The computer system of claim 41, wherein the override module changes the first color designation for printing of the subset to the second color designation independent of a user input.

44. A method of printing, comprising:
   overriding a non-black color designation for printing of a subset of a plurality of printable information units by changing, based on user input, the color designation to a printing color designation wherein the non-black color designation remains unchanged for display; and
   printing the plurality of printable information units such that the subset is printed in accordance with the printing color designation.

* * * * *